Mar. 13, 1923.

J. BILAN.
SPRING WHEEL.
FILED OCT. 13, 1922.

1,448,513.

Inventor
John Bilan
By F. K. Bryant
Attorney

Patented Mar. 13, 1923.

1,448,513

UNITED STATES PATENT OFFICE.

JOHN BILAN, OF FLINT, MICHIGAN.

SPRING WHEEL.

Application filed October 13, 1922. Serial No. 594,322.

*To all whom it may concern:*

Be it known that I, JOHN BILAN, a citizen of Ukraine, residing at Flint, in the county of Genesee and State of Michigan, have invented certain new and useful Improvements in Spring Wheels, of which the following is a specification.

The present invention relates to new and useful improvements in spring wheels, the primary object thereof residing in the provision of such a wheel that is of a comparatively simple construction, inexpensive of manufacture, and highly efficient in operation.

A further object of my invention is to devise a spring wheel wherein the same is provided with spoke members of a highly resilient nature and wherein a wheel provided with my type of resilient spoke need not be provided with the usual expensive pneumatic tires, but may employ, if found desirable, a cheaper type of solid rubber tire.

With the above general objects in view and others that will appear as the nature of the invention is better understood, the same consists of the novel form, combination and arrangement of parts hereinafter more fully described, shown in the accompanying drawing and claimed.

Figure 1:
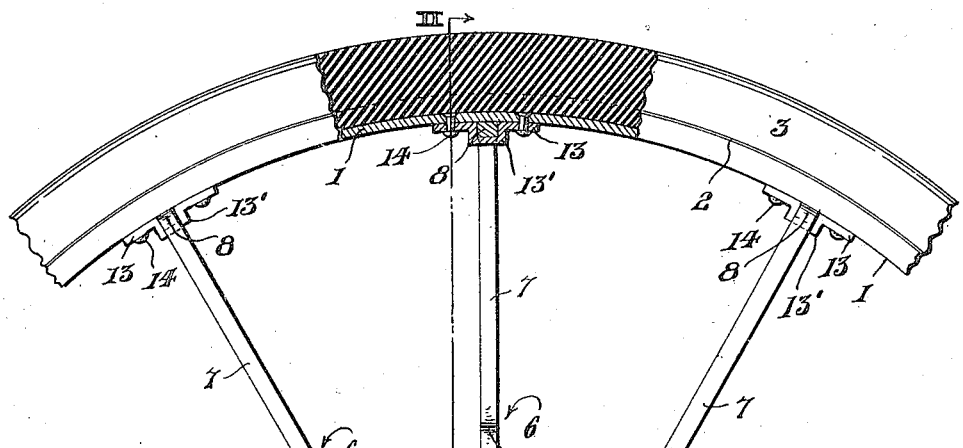
Figure 2:
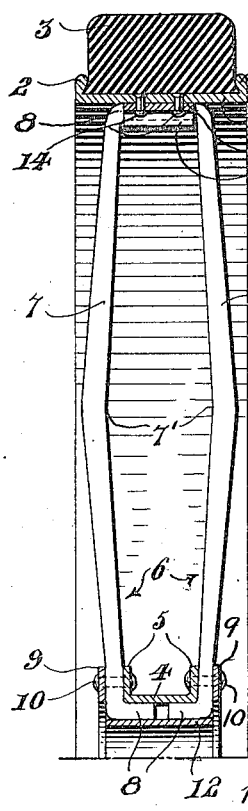
Figure 5:
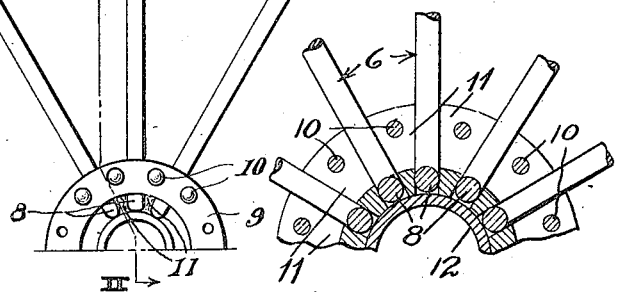
Figure 3:
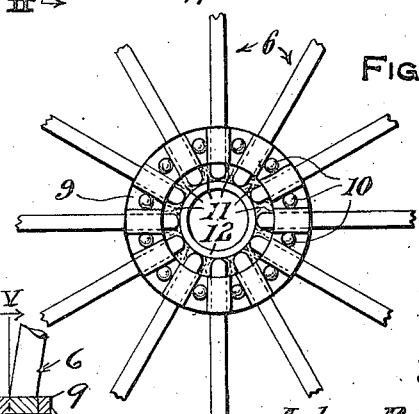
Figure 4:
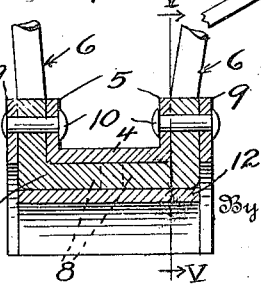

In the drawing, wherein like reference characters designate corresponding parts throughout the several views, Figure 1 is a fragmentary side elevational view of my device, a portion of the same being shown in cross section, Figure 2 is a vertical transverse sectional view upon the broken line II—II of Fig. 1, Figure 3 is a fragmentary side elevational view of the wheel hub showing the spoke members associated therewith, Figure 4 is a fragmentary transverse sectional view of the wheel hub and shows in detail the spacing wedge members positioned between the inner ends of the spokes, and Figure 5 is a fragmentary vertical sectional view taken on line V—V of Fig. 4.

Referring more in particular to the several views, my invention consists in the provision of a conventional type of wheel rim 1 having the usual integral side flanges 2 for receiving any desired form of solid cushion tire 3. The present device also consists in the provision of a novel form of hub 4 consisting of a hollow metallic tube having annular-shaped end flanges 5, and rigidly secured between the rim 1 and hub 4 are spaced resilient spoke members 6.

The essence of the present invention resides in the specific structure of these spoke members 6 together with the means for anchoring the same at their opposite ends between the rim 1 and hub 4 of the wheel. As more clearly shown in Fig. 2, each of these spoke members 6 are of substantially U-shape in formation, the same being readily bent into shape from steel rod members. As will be readily apparent these U-shaped spoke members consist of side vertically extending legs 7 joined at their upper ends by a cross bar 8, which cross bar is of a square formation. As shown in Fig. 2, these side legs 7 of each spoke 6 are so bent as to converge inwardly toward each other from their central connecting portion 7'. The extreme lower ends of the side legs 7 of each of the spoke members are adapted to be bent inwardly toward each other as at 8, these inwardly bent ends adapted to extend within the hub 4. For maintaining each of the side legs 7 of the spoke members in spaced relation to each other, annular-shaped washers 9 having suitable corrugations formed thereon are adapted for positioning over a portion of the side legs of the spokes to be rigidly secured to the flanged ends of the tubular hub 4 by bolts or rivets 10, these bolts or rivets extending between adjacent ones of the side legs, the annular flanges 5 of the hub and the adjacent washers having alined perforations formed therein for the reception of the bolt members 10. It will be readily understood that in view of the corrugations in the washer members 9 the corrugations will function as channel members for engaging over the adjacent side legs of the spoke members 6. Extending longitudinally within the hollow hub member 4 and being positioned between adjacent ones of the inturned ends of the side legs of the spokes are substantially U-shaped wedge members 11 suitably retained therein for presenting a smooth inner surface of the hub 4. It will be seen in Figs. 4 and 5 that the bolt members 10 pass through the outwardly projecting legs of the U-shaped wedge members for retaining the same in their desired position. Further provided within the hollow hub and engaging over the wedges 11 and the inturned ends 8 of the side legs is a bushing 12 for presenting a bearing surface to the vehicle axle received through the hub.

The upper square cross connecting bar 8 for the side legs 7 of each of the spoke members are rigidly secured to the adjacent inner face of the outer rim 1 by retaining plates 13, these plates having a central depressed U-shaped portion 13' for engaging over the connecting bars 8 of each spoke and as shown in Figs. 1 and 2 these locking plates 13 are secured to the inner face of the rim 1 by rivets 14 at each end thereof.

From the above description it will be readily understood that in view of my improved form of spring spoke 6, a highly resilient connection will be maintained between the hub and outer rim of the wheel, which resilience is of such a nature as to absolutely dispense with the conventional form of pneumatic tires.

While there is herein shown and described the preferred embodiment of the present invention, it is nevertheless to be understood that minor changes may be made therein without departing from the spirit and scope of the invention as claimed.

What is claimed as new is:—

1. In combination with a wheel including a rim and a hub wherein the hub has formed upon each of its ends an annular-shaped flange, a plurality of U-shaped spokes interposed between the rim and hub, means detachably connecting the rim to the outer end of each spoke, inwardly projecting portions formed upon the lower ends of the leg members of each spoke adapted for engagement within the opposite ends of the hub, a retaining washer positioned upon the lower end of the leg members and secured to the annular flanges of the hub, and a hollow bushing within the hub overlying the inwardly projecting portions upon the lower ends of the leg members.

2. In combination with a wheel including a rim and a hub wherein the hub has formed upon its opposite ends an annular-shaped flange, a plurality of U-shaped spoke members interposed between the rim and hub, means connecting the rim to the outer end of each spoke, inwardly projecting portions formed upon the lower ends of the leg members of each spoke adapted for engagement within the opposite ends of the hub, a washer secured to the flanges of the hub for retaining spokes therein, and wedge members extending longitudinally within the hub between the inwardly projecting portions of adjacent spoke members.

In testimony whereof I affix my signature.

JOHN BILAN.